United States Patent [19]

Thiel

[11] 4,350,076

[45] Sep. 21, 1982

[54] VACUUM BRAKE BOOSTER

[75] Inventor: Rudolf Thiel, Frankfurt am Main, Fed. Rep. of Germany

[73] Assignee: ITT Industries, Inc., New York, N.Y.

[21] Appl. No.: 143,251

[22] Filed: Apr. 24, 1980

[30] Foreign Application Priority Data

May 10, 1979 [DE] Fed. Rep. of Germany ....... 2918908

[51] Int. Cl.³ .............................................. F15B 9/10
[52] U.S. Cl. ................................ 91/369 A; 91/376 R
[58] Field of Search .............. 91/369 A, 369 B, 369 R

[56] References Cited

U.S. PATENT DOCUMENTS 3,350,882 11/1967 Leising .............................. 91/369 R
3,517,588 6/1970 Kytta ................................ 91/369 A
3,845,692 11/1974 Takeuchi ........................... 91/369 B Primary Examiner—Paul E. Maslousky
Attorney, Agent, or Firm—John T. O'Halloran; Alfred C. Hill

[57] ABSTRACT

In the brake booster known in the prior art, the partition wall comprises a metal disc supported by a control hub made of a plastic material. The force exerted on the partition wall is transmitted through the hub to a force transmitting member actuating a master brake cylinder. According to the present invention the hub is composed of a metal sleeve transmitting the forces and a guiding neck of plastic material including all air guiding channels of the control valve disposed therein. This guiding neck can be manufactured much easier and can be made of a plastic material of just sufficient strength to meet the reduced force transmitting requirements.

20 Claims, 4 Drawing Figures

VACUUM BRAKE BOOSTER

BACKGROUND OF THE INVENTION

The present invention relates to a vacuum brake booster for motor vehicles comprising low pressure housing which is divided into a vacuum chamber and working chamber by a rigid partition movable together with a control hub. Channels are arranged in the control hub for air guiding to connect the hollow interior chamber of the control hub, which contains a valve arrangement controlling the air guiding or flow, to the vacuum chamber and the working chamber.

From French Pat. No. 2,118,925 a vacuum brake booster has become known, in which the partition positively butts against a shoulder around the circumference of the control hub and is secured by a clamping circlip in its position at the control hub. The control hub, furthermore, embraces coaxially to the valve arrangement the force transmitting element in such a way that the reaction disc arranged on the force transmitting element is opposite the valve piston with a small clearance between reaction disc and valve piston.

The control hub projects out of the working chamber of the vacuum brake booster and is opened to the atmosphere. Furthermore, the interior chamber of the control hub is connected to the working chamber via radial openings and to the vacuum chamber via air guiding channels which are disposed at an angle of approximately 45 degrees to the axis of the control hub.

The valve arrangement is designed in such a way that it, being controllable by the piston bar of the operating device leading into the control hub, connects the working chamber to the vacuum chamber (resting position), or to the atmosphere (working position), or closes the air guiding channel to the working chamber (operational position).

In an embodiment having this type of the air guiding channels in the control hub leading to the vacuum chamber, the production requires a lot of material and is expensive. In addition the control hub must have grooves in order to secure the valve piston from the outside and must have an interior chamber designed in such a way that a sealing edge is created for the valve arrangement.

Furthermore, the air guiding channels are critical areas regarding stress created by the transmission of the vacuum forces.

SUMMARY OF THE INVENTION

Therefore, an object of the present invention is to provide a vacuum brake booster which eliminates the aforementioned disadvantages and includes a control hub or a unit, which can be easily produced and in which no critical areas regarding stress created by the transmission of the operating forces are created due to the channels for air flow.

A feature of the present invention is the provision of a vacuum booster comprising: a low pressure housing having a longitudinal axis; a rigid movable partition wall disposed in the housing coaxial of the axis to divide the housing into a vacuum chamber and a working chamber; and a control hub disposed in the housing coaxial of the axis connected to the partition wall, the control hub having a hollow interior chamber, a plurality of air guiding channels extending from the interior chamber to the vacuum chamber and the working chamber and a valve arrangement disposed in the interior chamber for controlling the air guiding flow in the air guiding channels, the control hub including two tubes concentric with respect to each other and coaxial of the axis and at least one axial groove disposed in one of the two tubes sealed by a wall of the other of the two tubes to provide one of the plurality of air guiding channels connecting the vacuum chamber to the valve arrangement.

In this way channels are created for air flow when the control hub is joined together without the channels creating critical areas regarding stress. No complicated injection moulding dies with inclined sliders are necessary.

By employing a tube-shaped insert positively connected with the partition, the guiding neck of the control hub is freed from all servo forces, since the servo forces act directly at the tube-shaped insert. Therefore, the control hub can be constructed at a slight cost and in a manner saving material. By means of this space-saving arrangement the necessary plan for the stroke of the booster is gained so that for the complete booster an extremely short constructional length and low weight are possible.

By the channel being formed by at least one axial groove located radially in the inside of the guiding neck of the control hub and with the groove being covered towards the central axis, or by an insert sleeve engaging the guiding neck in an atmospheric tight manner, an advantageous arrangement regarding manufacture of the grooves is ensured. When the guiding neck is advantageously made of plastic which can be sprayed, e.g. thermoplast, the grooves can be produced by a die mould. When the tube-shaped insert is made of metal, or glass fiber-strengthened thermoplast, the different force strain of the constructional units is taken into consideration. The guiding neck and the insert can be atomspherically sealed to one another by means of adhesives, or welding processes, for instance, ultrasonic welding. This connecting spot as well is not exposed to any servo forces, but must only ensure a cohesion of insert and flow neck so that the air guiding to the working chamber and vacuum chamber is guaranteed.

The connection between tube-shaped insert and guiding neck can be considerably simplified by spraying the guiding neck onto the tube-shaped insert. When the control hub is produced the tube-shaped insert can be automatically inserted into the spraying instrument where it is surrounded by thermoplast during production of the guiding neck. The channels connecting the working chamber to the valve arrangement are openings which run radially through the guiding neck and the tube-shaped insert. This allows the possibility of bringing the radial openings into the control hub only after fastening of the insert.

By employing several channels for air flow in such a way that above the circumference of the control hub a radial and an axial channel are alternately brought in, the time needed for building up pressure in the vacuum booster is considerably improved. In spite of considerably smaller cross-section of the channels relative to those in the state of art, a better reaction value of the vacuum brake booster is achieved.

By the valve piston being axially guided in the tube-shaped insert and its axial movability being limited by a stop brought into the insert, elements necessary for fastening are eliminated. In addition, the occurring lateral forces are intercepted in the insert so that thinwalled construction of the guiding neck of thermoplast are possible.

Since the stop can be axially variably brought in via an assembly means, it is possible to keep precisely the distance between valve piston and force transmitting element precisely determined for the exact functioning of the device without any problems regarding tolerance.

By having the end of the tube-shaped insert projecting into the guiding neck constructed as a axial sealing edge and serving the valve arrangement as valve seat, no special production tolerances must be maintained regarding the graduations in the interior chamber of the guiding neck. In addition, an annulus is created by this arrangement which serves the purpose of air guiding. The metal sealing edge is not subject to the same production tolerances as would occur when a sealing edge of plastic is located in the guiding neck.

By having the tube-shaped insert in the form of a sleeve having two different diameters, with the smaller diameter portion being located in the guiding neck and with the force transmitting element of the vacuum brake booster resting in the larger diameter portion and being supported by the step between the two portions, the force transmitting element is at the same time axially guided and radially held. This results in a force transmission unit which can be joined together and in which the axis of the individual transmission elements are aligned coaxially with respect to one another by the sleeve without any additional means. Thus, torques are largely avoided which arise with non-coaxial alignment of the force transmission elements and which would unnecessarily load the construction units of the vacuum brake booster.

By having the tube-shaped insert, or the section of the sleeve located in the guiding neck projecting out of the guiding neck to the force transmitting element, it is possible, after joining the guiding neck and the insert, to axially adjust the valve piston sliding in the insert by stops which are brought into the projecting part of the insert and to limit its axial sliding movement. As a result, the otherwise usual construction elements, such as clamping circlip, locking elements, safety discs riveted or riveted on etc., are saved.

Furthermore, it is very advantageous that the space to be precisely kept for the characteristic of the device, which is subject to variation due to production tolerances of the individual construction units, can precisely be adjusted by means of the axial variable attachment of the stops without any problems regarding the production tolerance.

By having the larger diameter portion of the sleeve inserted without any radial clearance into a coaxial pot of the partition and by having a stop inserted in the pot to engage the step between the two portions of the sleeve so that the sleeve is stationary relative to the partition, a fastening of the partition at the control hub is provided which allows a simple assembly as set forth hereinbelow.

By having the stop in the pot of the partition of such a depth that at the same time a passage opening for air guiding is created, a connection is produced between the vacuum chamber to the channels into the interior of the control hub and to the working chamber.

By having the tube-shaped insert, or the sleeve formed by the center of the partition so that the tube-shaped insert, or the sleeve, and the partition form a one-part constructional unit, the number of the constructional elements is reduced advantageously regarding costs. The cost may be further reduced if these constructional elements are made from thermoplastic material, which according to requirement can further be strengthened by fiber glass, or other materials.

The one-part construction unit may also be produced of a glass fiber-strengthened thermoplast or similar material with the force transmitting element supported by the construction unit enclosed by a tube-shaped metal body. This tube-shaped body may be located in the construction unit. However, it may also encircle the construction unit so as to encircle the force transmitting element. When the tube-shaped body in the form of a sleeve with step is located in the thermoplastic body, it can also encircle the force transmitting element.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
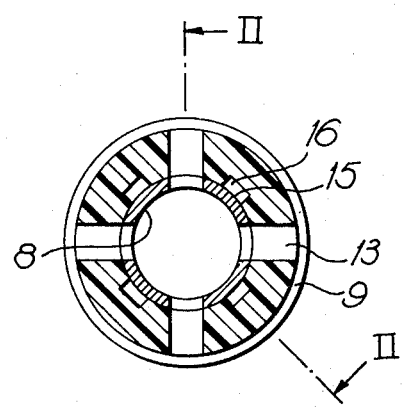
FIG. 1 is a transverse cross-sectional view of a portion of a control hub in the area of a sleeve of a vacuum brake booster in accordance with the principles of the present invention.
Figure 2:
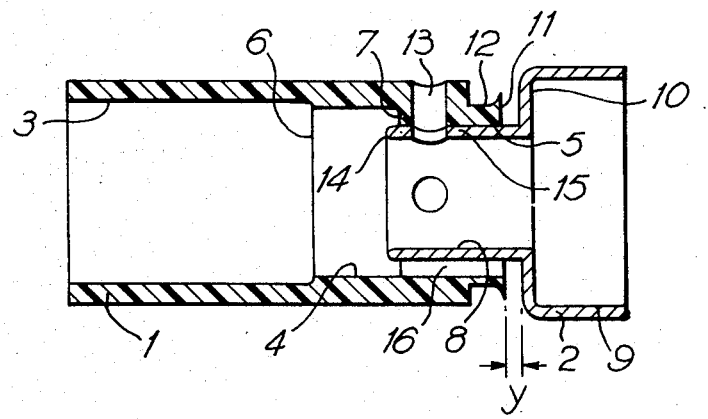
FIG. 2 is a longitudinal cross-sectional view along line II—II of FIG. 1.

FIGS. 1 and 2 essentially show a control hub composed of guiding neck 1 and sleeve 2 from different views. The interior chamber of guiding neck 1 is divided into three sections 3, 4 and 5 decreasing in diameter. The step 6 between sections 3 and 4 will, as described subsequently, serve the valve arrangement as a axial stop or axial holding step. The inner surface 15 in section 5 of guiding neck 1 has axial grooves 16, which are open into the interior chamber as well as to the outer chamber of guiding neck 1. In section 5 of guiding neck 1 the section 8 of sleeve 2 having a smaller diameter is inserted in such a way that a part 14 of section 8 projects into the interior chamber of guiding neck 1 and projects over the step 7 between sections 4 and 5. With its internal surface 15 guiding neck 1 tightly lies on the outer surface of section 8 of sleeve 2 and is atmospherically sealed at the internal surface of guiding neck 1 by means of adhesives, or welding processes (ultrasonic welding). Another possibility of connection between guiding neck 1 and sleeve 2 is provided by guiding neck 1 with sleeve 2 being inserted as insertion part into the spraying instrument, advantageously before the manufacturing procedure. The second section 9 of the sleeve 2 has such a great diameter as necessitated by the transmission relation in the device. The step 10 which exists from section 8 to section 9 of sleeve 2 is spaced a distance y from the outer edge 11 of guiding neck 1, which is required during subsequent assembly. A step 12 is adjacent outer edge 11 extends towards step 7 and surrounds the outer circumference. Step 12 receives the interior edge of the rubber diaphragm necessary for sealing. Openings or bores 13 run radially and are distributed over the circumference through section 5 as well as through section 8 of the control hub. Openings of bores 13 may, if required, be formed after assembly of sleeve 2.

As can be seen in FIG. 2 channels 16 running in section 5 are created only by the insertion of sleeve 2 such that the axial grooves in section 5 are limited radially by the exterior surface of section 8 of sleeve 2. The arrangement of radial and axial channels shown in FIGS. 1 and 2 is one of many possible embodiments. The number as well as the position of the channels may be varied according to the service conditions required and reaction times of the vacuum booster.

Figure 3:
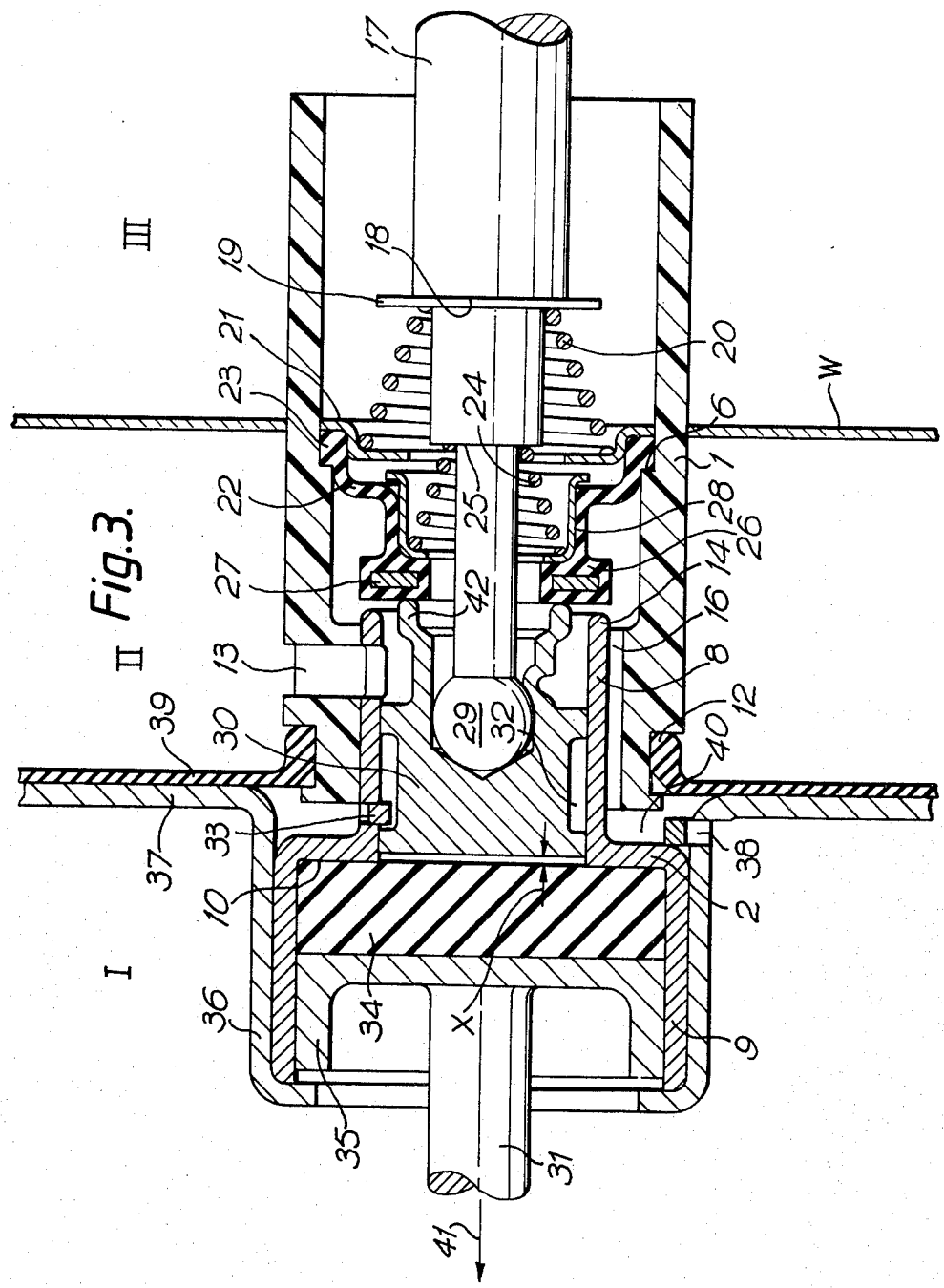
FIG. 3 is a longitudinal cross-sectional view of a first embodiment of a completely assembled control hub of a vacuum brake booster in accordance with the principles of the present invention.
Figure 4:
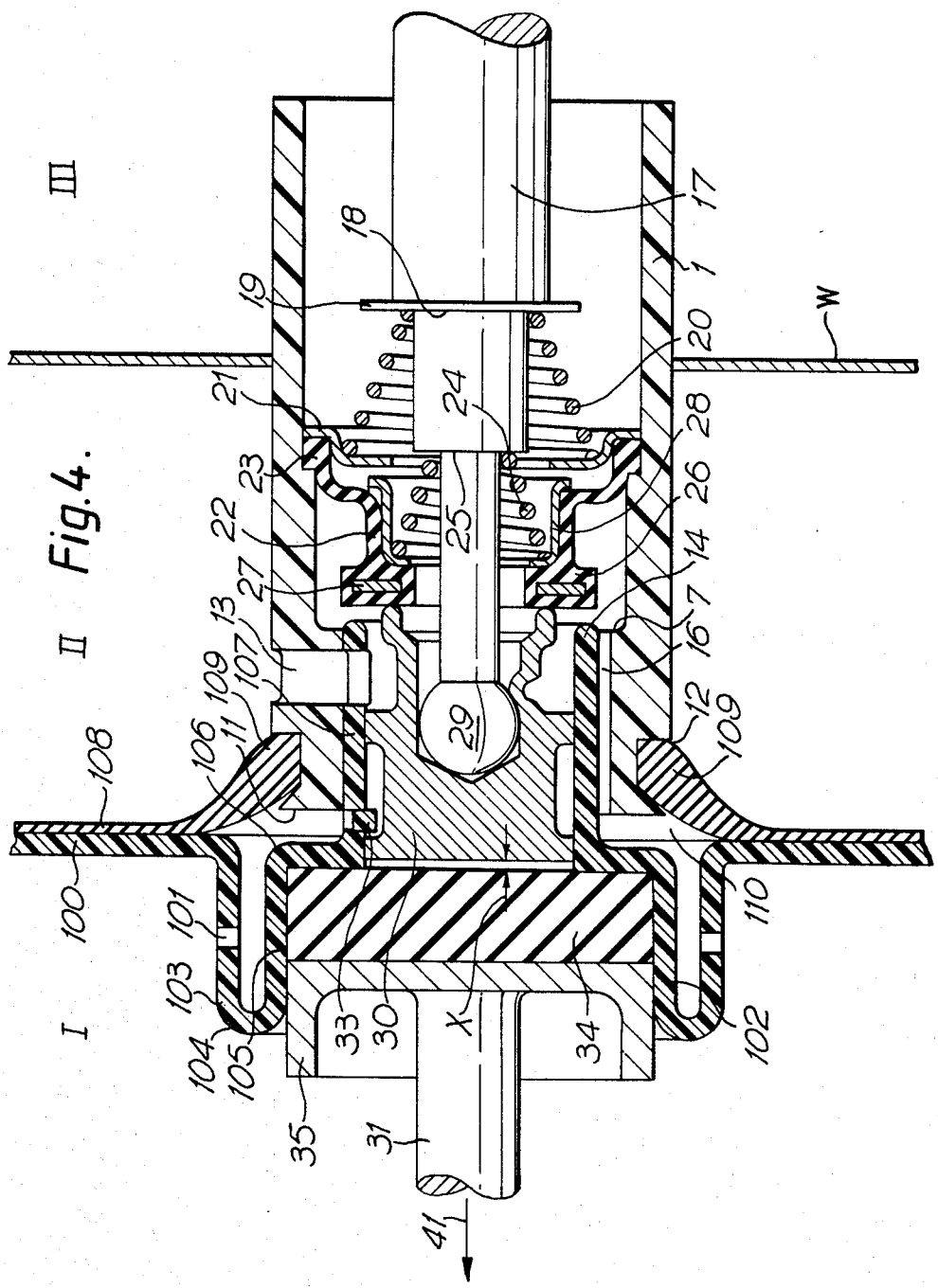
FIG. 4 is a longitudinal cross-sectional view of a second embodiment of a completely assembled control hub of a brake booster in accordance with the principles of the present invention.

Further embodiments according to the present invention are shown in FIGS. 3 and 4 and shall be explained with reference to a description of the assembly process. To facilitate comprehension the drawing plane is subdivided into three sections, wherein section I identifies the vacuum chamber, section II the working chamber and section III the atmosphere. Sections I and II are enclosed in a conventional low pressure housing of a brake booster one wall W of which is illustrated in FIGS. 3 and 4.

Referring to FIG. 3 during the assembly a control hub according to FIGS. 1 and 2 is taken as a basis in which guiding neck 1 and sleeve 2 are already one part, or assembled as such and into which bores 13 connecting the interior chamber of the control hub to working chamber II are already brought in. Before the assembly a valve arrangement with the following elements is slid onto the stepped piston bar 17. A disc 19 abutting on the step 18 of piston bar 17 supports a pre-stressed spring 20 which applies a force in the axial direction of piston bar 17 to a supporting disc 21, stepped in the cross-section corresponding to the step 6 of guiding neck 1 in its external diameter. Disc 21 engages the casing of a disc valve 22 and thereby presses the interior edge 23 of valve 22 against step 6 of guiding neck 1 when being placed into the control hub. The valve disc 26 of the disc valve 22 is strengthened by an insert 27 so that the force of spring 24 applied via a sleeve 28 can be transmitted without deformation of disc valve 22. Spring 24 is supported by the bottom of sleeve 28 and by the step 25 of piston bar 17. As spring 20, spring 24 is also pre-stressed in its resting position in the axial direction of piston bar 17. The ball-shaped head 29 of the smallest diameter section of piston bar 17 carries a valve piston 30. Following the slipping on of the valve arrangement piston 30 is clamped to head 29 without any radial and axial clearance in such a way that piston bar 17 can not be deviated out of its coaxial position relative to valve piston 30 and that the force transmitting element 31 can be deviated by only a few angular degrees. This assembled arrangement is brought into the control hub in such a way that valve piston 30 is axially slideably supported without radial clearance in section 8 of sleeve 2 and edge 23 of the valve arrangement, as already described, atmospherically sealed to step 6 of guiding neck 1. At its circumference valve piston 30 has a broad groove 32 so that after the assembly of valve piston 30 a stop 33 can be brought into section 8 of sleeve 2 adjacent step 10 to engage groove 32. Stop 33, thus, limits the axial movability of valve piston 30. Here it is especially advantageous that only with the insertion of stop 33 can the position of valve piston 30 be determined relative to reaction disc 34 in such a way that there is a defined clearance x between reaction disc 34 and piston 30. Reaction disc 34 is radially tightly located in section 9 of sleeve 2 on the head 35 of force transmitting element 31 and is supported by step 10 in sleeve 2.

The arrangement as above assembled is now inserted into the pot 36 of the movable partition wall 37. Hereby force transmitting element 31 projects out of the bottom of pot 36. The diameter at the bottom of pot 36 is chosen in such a way that head 35 of force transmitting element 31 cannot slide out of the bottom of pot 36, but rather is axially limited in its movability by the bottom of pot 36 and is thus secured therein. Sleeve 2 now lies radially without any clearance so deeply in pot 36 of partition wall 37 that a stop can be stamped out of the wall of pot 36, which engages behind step 10 of sleeve 2 and, thus, keeps the control hub tightly to partition wall 37 without axial clearance. The determining factor therein is that the air openings for connection of vacuum chamber I with the air channels of the valve arrangement must not be formed by additionally attached bores in partition wall 37 but are at the same time formed by the stamped-through stops 38 in pot 36 of partition wall 37. After the control hub has been firmly connected to partition wall 37 at step 12 of the control hub the interior edge of a tightly abutting rubber diaphragm 39 is clamped on. Rubber diaphragm 39, which is atmospherically sealed with its outer edge in the housing of the vacuum brake booster ensures the sealing of vacuum chamber I and working chamber II. A connection of these two chambers can only be produced via the air guiding channels provided in the control hub.

Piston bar 17 which is connected to an actuation device (not shown) controls the valve arrangement including valve piston 30 and control valve 22. In the shown resting position of the arrangement vacuum chamber I is connected to working chamber II via openings 38, via the annulus 40 sealed by the construction units and by rubber diaphragm 39, via channels 16, around sealing or projecting edge 14 and via openings 13. In this way in both chambers I and II equal atmospheric pressure or equal partial vacuum is prevailing so that no forces act on movable partition wall 37.

When the piston bar is moved in the direction of force transmission 41, valve disc 26 will abut on sealing edge 14 of section 8 of sleeve 2 and will thereby separate the connection between vacuum chamber I and working chamber II. In this position, the vacuum brake booster is in its working position provided that vacuum chamber I is connected to a vacuum source not shown.

With further movement of piston bar 17 into control hub 1 in direction 41 the edge 42 of valve piston 30 will lift off disc valve 26 and will connect working chamber II to atmosphere III. The flow of air from atmosphere III into working chamber II is ensured. The cross-section of the valve arrangement relative to piston bar 17 are dimensioned in such a way that sufficient quantities of air can stream into working chamber II in the time provided for. This results in a difference in pressure relative to vacuum chamber I which causes forces acting on the movable partition wall 37 in force transmission direction 41. These forces are transmitted via stops 38 onto sleeve 2 and, thus, via reaction disc 34 and head 35 onto force transmitting element 31. The control hub itself does not receive any actuation forces due to this arrangement. When piston bar 17 again moves out of the control hub, edge 42 of valve piston 30 again abuts on disc valve 26. Thereby the flow of atmospheric air into working chamber II is interrupted and with further moving back of piston bar 17 disc valve 26 will lift off sealing edge 14 of sleeve 2 and will again connect working chamber II to vacuum chamber I. Working chamber II is again evacuated so that by a readjusting spring (not shown) partition wall 37 with the control hub are brought back into their initial position. In this embodiment it is especially remarkable that for the formation of the air guiding channels spraying instruments without sloped slider can be utilized. Furthermore manufacturing tolerances can be compensated during the assembly by adjusting the parts towards one another. In the control hub itself no sealing edges having problems regarding tolerance are provided. Thereby, it is possible to use thermoplastic synthetics for the control hub, which can easily be processed and which due to shorter cycle times considerably reduce the price of the elements during production. Furthermore, by advantageous choice of the synthetics considerable reductions in weight of the vacuum brake boosters can be achieved.

The number of the air guiding channels provided as well as the number of the stops 33 and 38 provided for fixing, holding and air flow of the constructional units can according to requirements and conditions of utilization be chosen differently for each vacuum brake booster.

FIG. 4 differs from FIG. 3 only by a different construction of partition wall 100 and sleeve 102. As shown partition wall 100 extends radially inwardly, is bent at an angle of 90 degrees to a partial element 103 which is parallel to force transmitting direction 41, partial element 103 extends to a 180 degree bend 104 which joins a partial element 105 which extends a small distance parallel to partial element 103. Approximately at the position of partition wall 100 partial element 105 bends radially inwardly at 90 degrees to join partial element or step 106 which bends at an angle of 90 degrees to join the partial element 107 in the interior chamber of section 5 of guiding neck 1. The axial end of partial element 107 of partition wall 100 forms sealing edge 14 and, thus, projects over step 7 in guiding neck 1. Guiding neck 1 is, by means of its interior surface of section 5, atmospherically sealed on the outer surface of partial element 107. Force transmitting element 31 is via its reaction disc 34 fastened on head 35 supported by step 106 of partition wall 37 and radially tightly abuts against partial element 105 of partition wall 37. After insertion of piston bar 17 with the valve arrangement including valve disc 22 and valve piston 30, a stop 33 is brought in between outer edge 11 of guiding neck 1 and partial element 106. Stop 33 limits the axial movement of valve piston 30 sliding in partial element 107. Before outer edge 11 a step 12 is formed around guiding neck 1 and a rubber diaphragm 108 is seated in step 12. Rubber diaphragm 108 differs from rubber diaphragm 39 in FIG. 3 by the interior border 109 being formed considerably stronger. By this means it is ensured that the air guiding from vacuum chamber I to air guiding channel 16, which is provided by the opening 101 in partial element 103 of partition wall 100 and the annulus 110 bordered by partition wall 100, guiding neck 1 and rubber diaphragm 108, cannot be interrupted by the vacuum force drawing rubber diaphragm 108 into annulus 110 and interrupting the air flow. This can also be ensured by e.g. a ring, preferably made of plastic, being inserted before the assembly of rubber diaphragm 108 to support the rubber diaphragm. The mode of operation of this arrangement identically corresponds to that of FIG. 3. When rubber diaphragm 39 or 108 is correspondingly constructed groove 12 formed in the control hub may also be constructed as single step to edge 11 of guiding neck 1. It must only be guaranteed that the rubber diaphragm does not slip off the control hub due to the occurring vacuum forces.

If the technique in FIG. 4 is continued it is possible to design movable partition wall 37 or 100, sleeve 2 and guiding neck 1 as one constructional unit, similar to the vacuum pistons which are standard today and are, however, considerably more expensive and heavier. When choosing a material corresponding to the strains and stresses expected (e.g. glass-fiber-strengthened theremoplast or aluminium spraying diecasting), the channels for air flow may be produced by the die mould.

Since such an arrangement is made as one piece possible steps of assembly can be saved and, hence, a further reduction in price and weight can be achieved.

This invention also encompasses brake boosters which are operated by compressed air or pressure fluid as well as boosters for the actuation of system other than brakes, e.g. couplings.

While I have described above the principles of my invention in connection with specific apparatus it is to be clearly understood that this description is made only by way of example and not as a limitation to the scope of my invention as set forth in the objects thereof and in the accompanying claims.

I claim:
1. A vacuum booster comprising:
a low pressure housing having a longitudinal axis;
a rigid movable partition wall disposed in said housing coaxial of said axis to divide said housing into a vacuum chamber and a working chamber; and
a control hub disposed in said housing coaxial of said axis immovably connected to said partition wall, said control hub having a hollow interior chamber, a plurality of air guiding channels extending from said interior chamber to said vacuum chamber and said working chamber and a valve arrangement disposed in said interior chamber for controlling the air flow in said air guiding channels, said control hub including two tubes concentric with respect to each other and coaxial of said axis and at least one axially extending groove disposed in a portion of one of said two tubes sealed axially on both sides thereof by a wall of a portion of the other of said two tubes overlapping said portion of said one of said two tubes to provide one of said plurality of air guiding channels connecting said vacuum chamber to said valve arrangement, said one axial groove being coextensive with said overlapping portions of said two tubes.

2. A vacuum booster comprising:
a low pressure housing having a longitudinal axis;
a rigid movable partition wall disposed in said housing coaxial of said axis to divide said housing into a vacuum chamber and a working chamber; and
a control hub disposed in said housing coaxial of said axis connected to said partition wall, said control hub having a hollow interior chamber, a plurality of air guiding channels extending from said interior chamber to said vacuum chamber and said working chamber and a valve arrangement disposed in said interior chamber for controlling the air flow in said air guiding channels, said control hub including two tubes concentric with respect to each other and coaxial of said axis and at least one axially extending groove disposed in one of said two tubes sealed axially on both sides thereof by a wall of the other of said two tubes to provide one of said plurality of air guiding channels connecting said vacuum chamber to said valve arrangement, the inner one of said two tubes being provided by a central portion of said partition wall resulting in an integral unit.

3. A booster according to claim 2, wherein said integral unit is made from a strengthened thermoplast.

4. A vacuum booster comprising:
a low pressure housing having a longitudinal axis;
a rigid movable partition wall disposed in said housing coaxial of said axis to divide said housing into a vacuum chamber and a working chamber; and
a control hub disposed in said housing coaxial of said axis connected to said partition wall, said control hub having a hollow interior chamber, a plurality of air guiding channels extending from said interior chamber to said vacuum chamber and said working chamber and a valve arrangement disposed in said interior chamber for controlling the air flow in said air guiding channels, said control hub including two tubes concentric with respect to each other and coaxial of said axis, at least one axially extending groove disposed in one of said two tubes sealed axially on both sides thereof by a wall of the other of said two tubes to provide one of said plurality of air guiding channels connecting said vacuum chamber to said valve arrangement and at least one radially extending opening provided through both of said two tubes to provide another of said plurality of air guiding channels connecting said working chamber to said valve arrangement.

5. A booster according to claim 4, wherein the inner one of said two tubes is connected to said partition wall.

6. A booster according to claim 5, wherein said inner one of said two tubes is made of metal.

7. A booster according to claims 4 or 5, wherein said one axial groove is disposed in the inner wall of the outer one of said two tubes sealed by the outer wall of the inner one of said two tubes atmospherically sealed to the inner wall of the outer one of said two tubes.

8. A booster according to claim 7, wherein said outer one of said two tubes is made from a plastic material strengthened by glass fibers.

9. A booster according to claim 7, wherein the outer wall of the inner one of said two tubes is atmospherically sealed to the inner wall of the outer one of said two tubes by a weld.

10. A booster according to claim 4, wherein a plurality of said radially extending openings are distributed about the circumference of said control hub in an alternating relationship with a plurality of said axial grooves.

11. A booster according to claim 4, wherein said valve arrangement includes a disc valve and a valve piston associated with said disc valve, said valve piston axially sliding in the inner one of said two tubes with the axial movement thereof being limited by a stop disposed in said inner one of said two tubes.

12. A booster according to claim 11, wherein said stop can be positioned axially in said inner one of said two tubes during assembly to define the distance of axial movement of said valve piston.

13. A booster according to claim 11, wherein the end of the inner one of said two tubes projecting into said interior chamber is a sealing edge and serves as a valve seat for said disc valve.

14. A booster according to claim 13, wherein said inner one of said two tubes projects out of the outer one of said two tubes to a force transmitting element.

15. A vacuum booster comprising:
a low pressure housing having a longitudinal axis;
a rigid movable partition wall disposed in said housing coaxial of said axis to divide said housing into a vacuum chamber and a working chamber; and
a control hub disposed in said housing coaxial of said axis connected to said partition wall, said control hub having a hollow interior chamber, a plurality of air guiding channels extending from said interior chamber to said vacuum chamber and said working chamber and a valve arrangement disposed in said interior chamber for controlling the air flow in said air guiding channels, said control hub including two tubes concentric with respect to each other and coaxial of said axis and at least one axially extending groove disposed in the inner wall of the outer one of said two tubes sealed axially on both sides thereof by the outer wall of the inner one of said two tubes atmospherically sealed to the inner wall of the outer one of said two tubes to provide one of said plurality of air guiding channels connecting said vacuum chamber to said valve arrangement, the outer wall of the inner one of said two tubes being atmospherically sealed to the inner wall of the outer one of said two tubes by an adhesive.

16. A vacuum booster comprising:
a low pressure housing having a longitudinal axis;
a rigid movable partition wall disposed in said housing coaxial of said axis to divide said housing into a vacuum chamber and a working chamber; and
a control hub disposed in said housing coaxial of said axis connected to said partition wall, said control hub having a hollow interior chamber, a plurality of air guiding channels extending from said interior chamber to said vacuum chamber and said working chamber and a valve arrangement disposed in said interior chamber for controlling the air flow in said air guiding channels, said control hub including two tubes concentric with respect to each other and coaxial of said axis and at least one axially extending groove disposed in one of said two tubes sealed axially on both sides thereof by a wall of the other of said two tubes to provide one of said plurality of air guiding channels connecting said vacuum chamber to said valve arrangement, the inner one of said two tubes including a first section having a given diameter, a second section having a diameter greater than said given diameter and a step disposed between said first and second sections, said first section being disposed within the outer of said two tubes and said second section extends out of the outer one of said two tubes and supports therein a force transmitting element, said force transmitting element resting against said step.

17. A booster according to claim 16, wherein said second section is disposed in a pot of said partition wall coaxial of said axis without radial clearance, said pot having a stop therein engaging said step to render said inner one of said two tube immovable relative to said partition wall.

18. A booster according to claim 17, wherein said stop is disposed at a position in said pot to simultaneously provide a leak hole for air flow.

19. A booster according to claim 16, wherein said inner one of said two tubes is provided by a central portion of said partition wall resulting in an integral unit.

20. A booster according to claim 19, wherein said integral unit is made from a strengthened thermoplast.

* * * * *